J. W. Bemis.
Lifting-Jack.
Nº 74040. Patented Feb. 4, 1868.

Inventor.
James W. Bemis

Witnesses
W. C. Green
E. A. Brown

United States Patent Office.

JAMES W. BEMIS, OF FALL RIVER, MASSACHUSETTS.

Letters Patent No. 74,040, dated February 4, 1868.

IMPROVEMENT IN LIFTING-JACKS.

The Schedule referred to in these Letters Patent and making part of the same.

Be it known that I, JAMES W. BEMIS, of Fall River, Bristol county, Massachusetts, have invented a new and improved Method of Lifting Carriages; and I do hereby declare that the following is a full and exact description thereof, reference being had to the accompanying drawings, making a part of this specification, in which—

Figure 1:
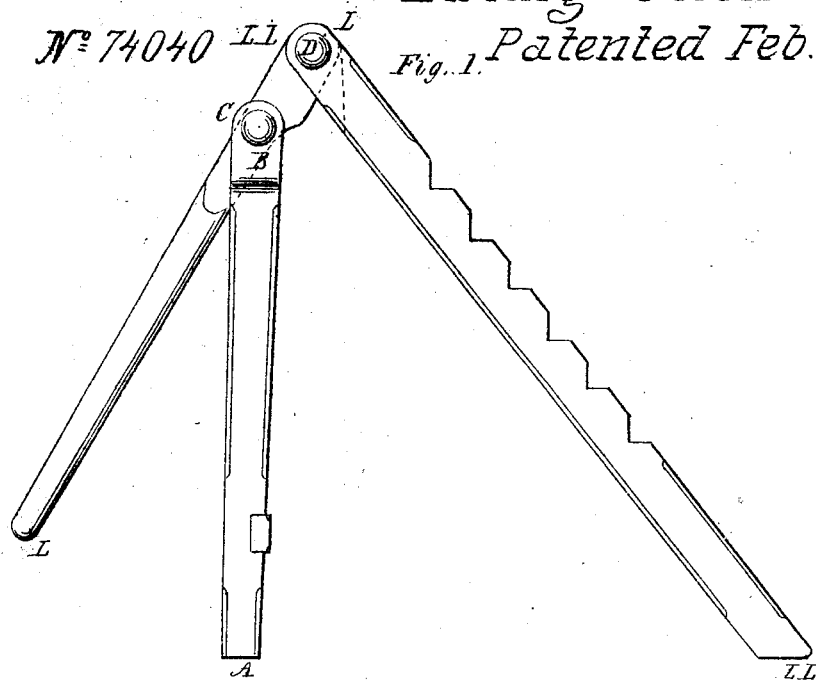
Figure 2:
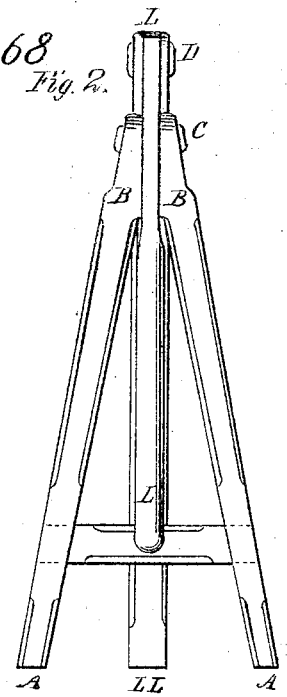

Figure 1 is a longitudinal view,

Figure 2 a transverse view, and

Figure 3:
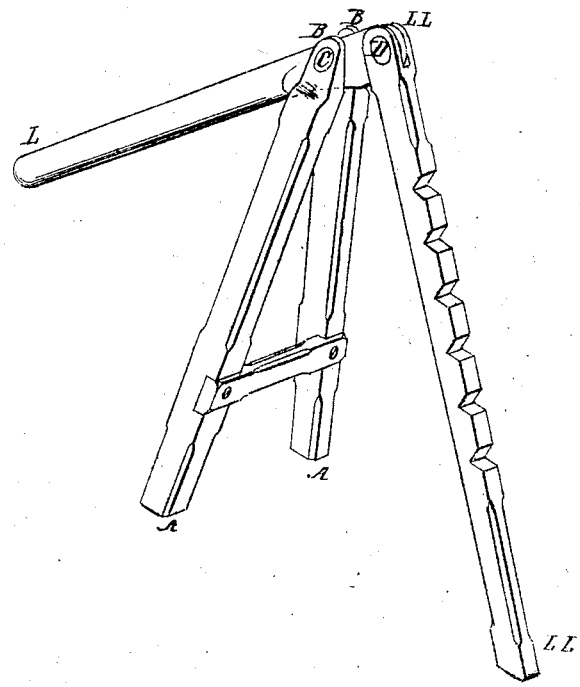

Figure 3 a perspective view.

A B, A B, in figs. 2 and 3, are vertical standards, supporting, at their vertex B B, the lever L L, which is pivoted at C to the vertical standard A B, A B. The lever L L is again connected to the eccentric-lever L L, L L, at D. This eccentric-lever L L, L L has a series of notches or steps of increasing height to suit the varying heights of axles under which it is placed. Placing the eccentric-lever L L, L L under the axle of the carriage, upon one of the series of notches or steps, the lever L L being raised, after which, by throwing down the lever L L, as seen in fig. 2, the axle is raised, and both wheels, if desired, will be raised clear from the ground, and, by reason of the vertical standards A B, A B, will not be subject to any lateral motion.

What I claim as my invention, and desire to secure by Letters Patent, is—

1. The arrangement, as described, of the levers L, and L L, L L, together with the standard A B, A B.

2. Also, the combination of the levers L, and L L, L L, together with their supporting-frame by which the power to raise the axle is obtained, substantially as described, and set forth as above.

JAMES W. BEMIS.

Witnesses:
W. C. GREENE,
E. G. BROWN.